United States Patent [19]

Kamosaki et al.

[11] 3,992,478
[45] Nov. 16, 1976

[54] PAINT COMPOSITION DISPERSIBLE IN WATER AND WATER BASE PAINT

[75] Inventors: Minoru Kamosaki; Sigeru Asai, both of Saitama, Japan

[73] Assignee: Daicel Ltd., Osaka, Japan

[22] Filed: Aug. 26, 1974

[21] Appl. No.: 500,453

[30] Foreign Application Priority Data
Aug. 27, 1973  Japan.................................. 48-95827

[52] U.S. Cl..................... 260/857 UN; 260/29.6 NR; 260/29.6 XA; 260/29.6 RW; 260/897 B; 428/474; 428/523
[51] Int. Cl.$^2$.................... C08L 77/06; C08L 23/06; C08L 23/08
[58] Field of Search............... 260/29.2 N, 29.6 XA, 260/29.6 RW, 31.2 N, 857 UN, 897 B, 29.6 NR

[56] References Cited
UNITED STATES PATENTS

| | | |
|---|---|---|
| 2,948,638 | 8/1960 | Baird et al. .......................... 428/407 |
| 3,582,507 | 6/1971 | Peerman ......................... 260/29.2 N |
| 3,840,487 | 10/1974 | Dyson et al. ............... 260/29.6 RW |

FOREIGN PATENTS OR APPLICATIONS 2,007,971  12/1971  Germany

*Primary Examiner*—Murray Tillman
*Assistant Examiner*—W. C. Danison, Jr.
*Attorney, Agent, or Firm*—Woodhams, Blanchard and Flynn

[57] ABSTRACT

A paint composition dispersible in water is disclosed, characterized by comprising 100 parts by weight of a thermoplastic synthetic resin powder having an average particle diameter in the range of about 0.1 to 250 $\mu$, 0.01 to 3 parts by weight of an additive of sodium polyacrylate or polyacrylamide and 0 to 20 weight percent, based on the weight of sodium polyacrylate or polyacrylamide, of an acid substance.

6 Claims, No Drawings

PAINT COMPOSITION DISPERSIBLE IN WATER AND WATER BASE PAINT

BACKGROUND OF THE INVENTION

1. Field of the Invention

This invention relates to a paint composition dispersible in water and which can be suspended in water or in a medium mainly comprising water to yield a highly stable suspension suitable as a water-base paint.

2. Description of the Prior Art

In general, the methods of application of synthetic resin powder as a paint or coating can be divided roughly into two groups. One group comprises application of the powder by itself as in the fluidized bed method or the electrostatic coating method. The other group comprises application of a suspension of the synthetic resin powder in a dispersion medium. Generally, the latter method is preferred to the former in most cases, because the former presents difficulties in workability and in controlling the coating thickness owing to scattering of the powder dust. However, in the latter method, an organic solvent is generally used at present as the dispersion medium, and this is undesirable from the viewpoints of workability and human health.

On the other hand, if a process for dispersing the synthetic resin powder in a medium mainly comprising water is employed, the paint thus obtained can be applied onto the surface of the object to be coated, such as a metal object. The coated object can then be heated to evaporate the solvent mainly comprising water and then further heated to a temperature above the melting point of the synthetic resin to melt the resin, thereby forming on the object a coating film. Thus, a coating film of any desired thickness having an excellent adhesive property and smoothness can be obtained without damaging the essential properties of the synthetic resin as is apt to happen with an organic solvent. Therefore, the disadvantages caused by the use of an organic solvent can be overcome.

But, in fact, it is very difficult to suspend, in a medium mainly comprising water, a resin powder having an average particle size of about 0.1 to 250 $\mu$ prepared from masses or grains of a synthetic resin by a mechanical pulverization or precipitation of the resin powder from a solvent solution of the resin. Such a powder cannot be dispersed readily, by itself, in the medium, because its particle size is larger than that of the so-called emulsion obtained by carrying out the polymerization per se in an aqueous medium.

When a water-soluble polymer such as polyvinyl alcohol or carboxymethylcellulose (CMC) is used as a dispersing agent, the resultant coated film has a poor thermal resistance and a severely reduced adhesive strength, and furthermore, the film is heavily colored.

SUMMARY OF THE INVENTION

The inventors have discovered that an advantageous paint composition easily dispersible in water, can be obtained by adding (a) 0.01 to 3 parts by weight, preferably 0.3 to 2 parts by weight, of sodium polyacrylate or polyacrylamide, and (b) from 0 to 20 weight percent, preferably 3 to 15 weight percent, based on the weight of sodium polyacrylate or polyacrylamide, of an acid, to (c) 100 parts by weight of a thermoplastic synthetic resin powder having an average particle diameter of 0.1 to 250 $\mu$.

The kinds of acid used in the present invention are not particularly limited. The acid must be soluble in a medium mainly comprising water. The acid is preferably a solid powder at room temperature (20° – 25° C). It should also be essentially non-reactive with the synthetic resin and sodium polyacrylate or polyacrylamide at room temperature. Although a variety of monobasic and polybasic acids can be used, polybasic acids are generally preferred, because they are more effective. Citric acid and succinic acid are especially preferred.

The paint composition of the present invention can be prepared for application to objects in the form of a liquid paint by adding thereto and mixing therewith only water or an aqueous medium mainly comprising water. The concentration of the paint composition in the water or aqueous medium can be chosen according to the conditions of use. Generally, a preferred weight ratio is 100 parts by weight of the above-described paint composition to 100 to 400 parts by weight of water.

The aqueous medium can be distilled water, deionized water or tap water, and it can contain a minor proportion (less than about 20 weight percent) of a water miscible inert solvent component such as a lower alkanol.

The thermoplastic resin can be a powder of any thermoplastic synthetic resin such as a polyamide exemplified by the nylons such as nylon-11, nylon-12, nylon copolymers (e.g., nylon-6/12, nylon-6/66) and nylon terpolymers (e.g., nylon-6/66/610, nylon-6/66/12) or the polyolefins exemplified by polyethylene and ethylene-vinyl acetate copolymers.

The composition or the water paint made from it can also contain minor amounts of the order of 0.01 to 5 weight percent of various optional additives, such as an anti-foaming agent such as silicone oils (e.g., polymethyl siloxane).

The composition of the present invention has the advantage in that it can be made in the form of a powder by mixing the powdery components together. Accordingly, it can be transported in the form of a powder from a resin manufacturer or paint manufacturer to a painter or to a place of painting and used at that place by adding and mixing only water or aqueous medium thereto. Furthermore, in a painting system wherein the object to be painted is dipped in a liquid bath of the paint, if the resin concentration of the bath becomes reduced, the composition of the present invention can be supplemented at a predetermined rate to keep the concentration of the bath constant.

Another advantage of the composition of the invention is that it can be stored in the form of a powdery mixture without risk of deterioration in quality.

The present invention will be further described by reference to the following illustrative Examples, together with Comparative Examples.

In the following examples the dry ingredients, that is to say, (A) the pulverized or comminuted thermoplastic resin (100 parts), (B) the sodium polyacrylate, or alternatively, polyacrylamide, (0.01 to 3 parts), (C) the acid (0 to 20 weight percent of B) can be mixed to form a homogeneous powder which then can be mixed with the aqueous medium as a separate or subsequent step.

EXAMPLE 1

Forty parts of nylon-12 powder (average particle diameter: 65 $\mu$), 0.05 part of sodium polyacrylate and 100 parts of water were mixed together with stirring to obtain a homogeneously suspended dispersion. The dispersion was then applied to a steel plate of a thickness of 1.2 mm by dipping. The plate was then heated to 270° C for 5 minutes in an air oven and then cooled to obtain a smooth film coating of a thickness of 20 $\mu$ having an excellent surface gloss and adhesive property.

EXAMPLE 2

Forty parts of nylon-12 powder, 0.1 part of sodium polyacrylate, 0.008 part of succinic acid, 0.001 part of an anti-foaming agent (silicone oil) and 100 parts of water were mixed together with stirring to obtain a homogeneous dispersion. The dispersion was then applied to a steel plate of a thickness of 1.2 mm by dipping. The plate was then heated to 270° C for 5 minutes in an air oven and then cooled to obtain a smooth coating film of a thickness of 60 $\mu$ having an excellent surface gloss and adhesive property.

EXAMPLE 3

Forty parts of nylon-11 powder, 0.15 part of sodium polyacrylate, 0.015 part of citric acid and 0.001 part of an anti-foaming agent (silicone oil) were stirred in a solvent mixture of 90 parts of water and 10 parts of methanol to obtain a homogeneously suspended dispersion. The dispersion was then applied to a steel plate of a thickness of 1.2 mm by dipping. The plate was then heated to 280° C for 5 minutes in an air oven and then cooled to obtain a smooth coating film of a thickness of 50 $\mu$ having an excellent surface gloss and adhesive property.

EXAMPLE 4

Forty parts of polyethylene powder (average particle diameter: 80 $\mu$), 0.2 part of sodium polyacrylate and 0.02 part of succinic acid were stirred in 100 parts of water to obtain a homogeneously suspended dispersion. The dispersion was then applied to a steel plate of a thickness of 1.2 mm by dipping. The plate was then heated to 270° C for 4 minutes in an air oven and then cooled to obtain a smooth coating film of a thickness of 50 $\mu$ having an excellent surface gloss.

COMPARATIVE EXAMPLE 1

Forty parts of nylon-12 powder and 4.8 parts of polyvinyl alcohol (Gosenol GH-17, a product of Nihon Gosei Kagaku Kogyo K.K.) were stirred in 100 parts of water. The mixture was then applied to a steel plate of a thickness of 1.2 mm by dipping. The plate was then heated to 270° C for 5 minutes in an air oven and then cooled to obtain a coating film. The film was severely colored and was, therefore, unacceptable.

COMPARATIVE EXAMPLE 2

A coating film was obtained in the same manner as in Comparative Example 1 except that only the polyvinyl alcohol was replaced by 2.4 parts of methyl cellulose or hydroxypropylmethyl cellulose (Metholose R 60 SH, a product of Shin'etsu Kagaku Co.). The coating film thus obtained was severely colored and was, therefore, unacceptable.

The embodiments of the invention in which an exclusive property or privilege is claimed are defined as follows:

1. A powder composition adapted to be suspended in an aqueous medium to form a water-based paint, consisting essentially of: 100 parts by weight of a thermoplastic synthetic resin powder having a particle diameter in the range of about 0.1 to 250 $\mu$, said synthetic resin being selected from the group consisting of nylon-11, nylon-12, nylon-6/12, nylon-6/66, nylon-6/66/610, nylon-6/66/12, polyethylene and ethylene-vinyl acetate copolymers; from 0.01 to 3 parts by weight of an additive selected from the group consisting of sodium polyacrylate and polyacrylamide; and from 3 to 15 percent by weight, based on the weight of sodium polyacrylate or polyacrylamide, of an acid selected from the group consisting of citric acid and succinic acid.

2. The composition according to claim 1 which contains additionally a minor amount of anti-foaming agent.

3. The composition according to claim 1 wherein the thermoplastic synthetic resin is a member of the group consisting of nylon-12, nylon-11 and polyethylene.

4. A composition according to claim 1 in which said resin is nylon-12, said additive is sodium polyacrylate and said acid is succinic acid.

5. A composition according to claim 1 in which said resin is nylon-11, said additive is sodium polyacrylate and said acid is citric acid.

6. A composition according to claim 1 in which said resin is polyethylene, said additive is sodium polyacrylate and said acid is succinic acid.

* * * * *